United States Patent
Al-banna et al.

(10) Patent No.: US 10,129,171 B2
(45) Date of Patent: Nov. 13, 2018

(54) ALLOCATION AND SCHEDULING FOR TIME AND FREQUENCY DIVISION MULTIPLEXING SYSTEM

(71) Applicant: ARRIS Enterprises LLC, Suwanee, GA (US)

(72) Inventors: Ayham Al-banna, Orland Park, IL (US); Gregory Gohman, Beaverton, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 263 days.

(21) Appl. No.: 15/137,153

(22) Filed: Apr. 25, 2016

(65) Prior Publication Data
US 2017/0019347 A1   Jan. 19, 2017

Related U.S. Application Data

(60) Provisional application No. 62/193,361, filed on Jul. 16, 2015.

(51) Int. Cl.
| | |
|---|---|
| *H04L 12/911* | (2013.01) |
| *H04L 5/00* | (2006.01) |
| *H04L 27/34* | (2006.01) |

(52) U.S. Cl.
CPC .......... *H04L 47/782* (2013.01); *H04L 5/0005* (2013.01); *H04L 5/0007* (2013.01); *H04L 5/0037* (2013.01); *H04L 27/34* (2013.01)

(58) Field of Classification Search
CPC ..... H04L 5/0007; H04L 27/34; H04L 5/0037; H04L 5/0005; H04L 47/782
See application file for complete search history.

(56) References Cited

U.S. PATENT DOCUMENTS 6,459,703 B1 * 10/2002 Grimwood ............ H04J 3/1694
370/441
7,230,909 B1 * 6/2007 Raissinia .............. H04L 5/0007
370/206
(Continued)

FOREIGN PATENT DOCUMENTS

EP    1063801 A2    12/2000

OTHER PUBLICATIONS

PCT Search Report & Written Opinion, Re: Application No. PCT/US2016/041509, dated Sep. 15, 2016.

*Primary Examiner* — Oussama Roudani
(74) *Attorney, Agent, or Firm* — Lori Anne D. Swanson

(57) ABSTRACT

A Time and Frequency Division (TaFD) scheduler based on a TaFD allocation unit based credit allocation may schedule both time and frequency division for both legacy Data Over Cable Service Interface Specification (DOCSIS) channels and DOCSIS orthogonal frequency division multiple access (OFDMA) channels. In embodiments, scheduling by the TaFD schedules both single carrier quadrature amplitude modulation (SC-QAM) transmissions and OFDMA upstream transmissions. In embodiments, the scheduler schedules based on TaFD allocation unit based credit allocations, where TaFD allocation unit based credits may be allocated for OFDMA overlapped regions. The credits may be dynamically adjusted based on channel utilization and an outstanding bandwidth demand or a prioritized pending bandwidth demand. The TaFD scheduler may use independent hierarchy priority queuing schemes.

20 Claims, 9 Drawing Sheets

TIME AND FREQUENCY DIVISION (TaFD) SCHEDULER - FLEXIBLE SPECTRUM ASSIGNMENT TO DIFFERENT CHANNELS AS NEEDED

(56) References Cited

U.S. PATENT DOCUMENTS

| | | | |
|---|---|---|---|
| 7,738,596 B2* | 6/2010 | Lin | H04B 7/18582 |
| | | | 375/295 |
| 7,974,303 B2 | 7/2011 | Barker et al. | |
| 8,516,532 B2* | 8/2013 | Ulm | H04N 7/17318 |
| | | | 725/90 |
| 8,654,640 B2* | 2/2014 | Ulm | H04L 12/2801 |
| | | | 370/232 |
| 2014/0219293 A1 | 8/2014 | Williams et al. | |

* cited by examiner

US SPECTRUM IS SHARED BY 2 LEGACY D3.0 CHANNELS AND 1 D3.1 OFDMA CHANNEL

FREQUENCY DIVISION

TIME DIVISION

FREQUENCY DIVISION

HYBRID TIME DIVISION AND FREQUENCY DIVISION (H-TD-FD) US SCHEDULER - COMBINATION OF TD AND FD SCHEDULERS

TIME DIVISION: APPROXIMATE TaFD FUNCTIONALITY, DUTY CYCLE - APPROACH 1

ALLOCATION AND SCHEDULING FOR TIME AND FREQUENCY DIVISION MULTIPLEXING SYSTEM

CROSS-REFERENCE TO RELATED APPLICATIONS

This application claims the benefit of priority under 35 U.S.C. § 119(e) to U.S. Provisional Application No. 62/193,361 filed on Jul. 16, 2015, the entire disclosures of which is incorporated herein by reference.

BACKGROUND

Operators of cable television systems, also known as Multiple Service Operators (MSOs), continuously make attempts to offer faster service to meet customer demand and competition for better service, yielding higher peak rates year after year. To accommodate higher peak rates, the Data Over Cable Service Interface Specification (DOCSIS) 3.1 specifications were developed and issued in 2013. DOCSIS 3.1 standard promises a great capacity potential by extending the spectrum in both the downstream (DS) and upstream (US) directions. DOCSIS 3.1 extends the spectrum by using, in part, a modern PHY technology (i.e., Orthogonal Frequency Division Multiplexing (OFDM)), and improved Forward Error Correction (FEC) technology (i.e., Low Density Parity Check Codes (LDPC)).

However, upstream (US) resource allocation and scheduling in DOCSIS networks continues to have challenges that are different from those of downstream (DS) scheduling, where the traffic is broadcasted to all modems at once. Issues in the US direction that affect network migration include noise funneling, distortion, burst transmission, topology resolution, multiple access, etc. Further, the migration to DOCSIS 3.1 may be challenging due to differences in technology from DOCSIS 3.0 to DOCSIS 3.1. For example, the migration in the US can be more challenging than the DS due to the limited available spectrum and the potential spectral overlap for DOCSIS 3.1 OFDMA channels and DOCSIS 3.0 Single-Carrier Quadrature Amplitude Modulation (SC-QAM) channels.

In DOCSIS 3.0 and earlier DOCSIS versions, two kinds of channels were supported: TDMA/ATDMA (time division multiple access/advanced time divisional multiple access) and SCDMA (synchronous code division multiple access). For ATDMA, a time-division operation, one cable modem (CM) is allowed to transmit at a time per channel. Each TDMA/ATDMA channel is independent (i.e., frequency division is employed such that each channel operates on a different frequency). For SCDMA channels, multiple cable modems (CM)s can transmit at the same time. Since the bandwidth (BW) allocated to the SCDMA channel is not shared by other channels (i.e., frequency division), different SCDMA channels can be treated independently.

The creation of DOCSIS 3.1 introduced the concept of orthogonal frequency division multiple access (OFDMA) channels which allows simultaneous CM transmissions within a channel and also allows OFDMA channels to overlap with ATDMA channels. This latter feature means that the overlapping part of the spectrum can be used by ATDMA channels for some time and OFDMA channels for some other times (i.e., time division). That is, the ATDMA channels and OFDMA channels have to time-share the overlapped frequency. However, under these circumstances, a channel's US scheduler cannot be completely independent and there is no coordination of transmissions on the overlapping channels.

Improved techniques for coordination and scheduling of overlapping channels in a cable television system, such as overlapping DOCSIS channels, are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying FIGs. serve to illustrate embodiments of concepts that include the claimed invention, and explain various principles and advantages of those embodiments, the concepts displayed are not necessary to understand the embodiments of the present invention, as the details depicted in the FIGs. would be readily apparent to those of ordinary skill in the art having the benefit of the description herein.

DETAILED DESCRIPTION

Disclosed herein are techniques for coordinating between simultaneous transmissions on overlapping channels in a shared spectrum. Existing technologies either do not provide a coordinated manner for scheduling simultaneous transmissions where overlapping channels exist, or the solutions are lacking. The disclosed techniques include a Time and Frequency Division (TaFD) scheduler that is based on a TaFD allocation unit (TAU) based credit allocation. An upstream (US) scheduling features may be a module within the Cable Modem Termination System (CMTS) that coordinates access to an upstream channel for all cable modems (CM)s on that channel. The US scheduler may be designed to grant access to different CMs and satisfy their Quality of Service (QoS) and Service Level Agreement (SLA) rates given a limited spectrum with overlapping channels.

The disclosed techniques also include a scheduler that schedules time and frequency division for single carrier quadrature amplitude modulation (SC-QAM), such as TDMA, ATDMA, or SCDMA, and orthogonal frequency division multiple access (OFDMA) upstream transmissions. The disclosed US scheduler may provide a smooth migration path and deliver required peak rates as well as satisfy subscriber QoS constraints.

As described in more detail, in embodiments the scheduler schedules based on TaFD allocation unit based credit allocations and uses independent hierarchy priority queuing schemes. TaFD allocation unit based credits are credits that may be allocated for OFDMA overlapped regions. The credits may be dynamically adjusted based on channel utilization, an outstanding bandwidth demand or prioritized pending bandwidth demand, idle time on a channel, or the like. In embodiments, the independent schedulers may communicate to each other NULL and guard times so that overlapped regions can be scheduled without any collision.

Figure 1:
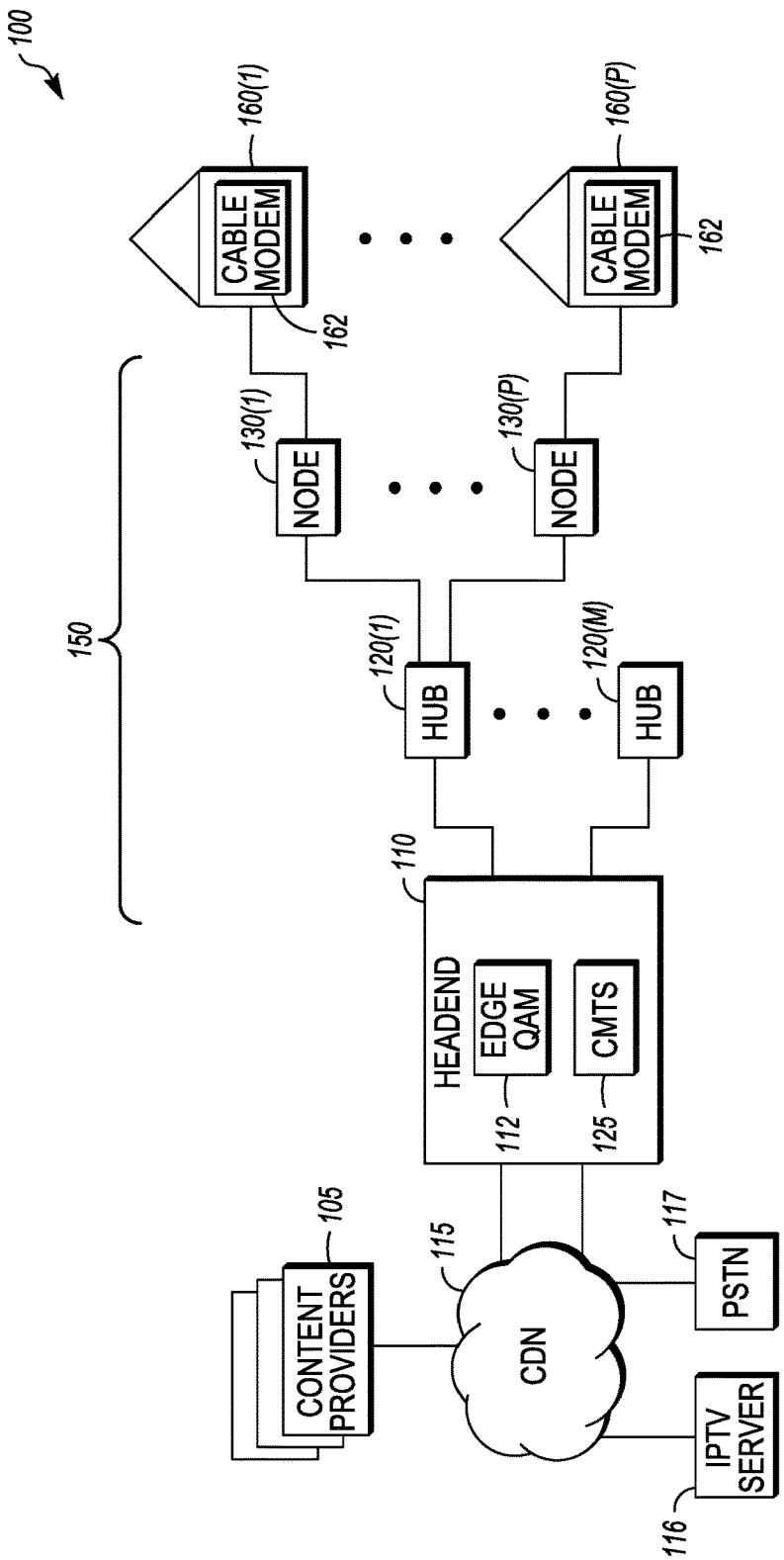
FIG. 1 illustrates an example cable television system that may implement orthogonal frequency division multiple access (OFDMA), TDMA/ATDMA (time division multiple access/advanced time divisional multiple access) and/or SCDMA (synchronous code division multiple access) techniques.

FIG. 1 illustrates an example cable television system having a headend 110 that receives content over a content delivery network 115 and delivers content via a network to cable modems 162 or subscribers 160. Such cable television system may employ channels for delivering content, which may include DOCSIS channels including but not limited to any of the following: an orthogonal frequency division multiple access (OFDMA channel, TDMA/ATDMA (time division multiple access/advanced time divisional multiple access) channels, and/or SCDMA (synchronous code division multiple access) channels.

As introduced in DOCSIS 3.1, an orthogonal frequency division multiple access (OFDMA) is a manner of encoding digital data on multiple carrier frequencies, i.e., a plurality of subcarriers. The available bandwidth of an OFDMA channel may be divided into many narrow bands for transmitting data on these bands (subcarriers) in parallel, where the signals transmitted are mathematically orthogonal. Data is carried over the subcarriers by varying the phase or amplitude of each subcarrier (e.g., QPSK, 4-QAM, 16-QAM, 64-QAM, etc.).

An OFDMA channel is composed of many subcarriers, where each subcarrier may use a different modulation. In embodiments, the modulation level on each subcarrier results from varying the complex numbers at a Fourier transform input, e.g., an inverse fast Fourier transform input in the transmitter. The outputs include samples of a modulated multiplexed signal. A small subcarrier spacing or symbol rate makes affordable the use of a guard interval between symbols, making it possible to minimize or eliminate intersymbol interference (ISI).

OFDMA is a scheme that may be developed for wideband digital communication, whether wireless or over copper wires. OFDMA may be used in any data transmission, including applications such as digital television and audio broadcasting, Digital Subscriber Line (DSL) internet access, wireless networks, and 4G mobile communications. OFDMA is useful for many solutions, including, by way of example but not limited to: asymmetric digital subscriber loop (ADSL) and very high speed digital subscriber line (VDSL) broadband access via plain old telephone service (POTS) or public switched telephone network (PSTN) copper wiring, digital video broadcasting-cable (DVB-C), e.g., DVB-C2, power line communication (PLC), International Telecommunications Union (ITU) Telecommunications Standardization Sector (ITU-T) implementations, e.g., ITU-T G.hn high speed local area networking, Multimedia over Coax Alliance (MOCA), DOCSIS, and others.

FIG. 1 illustrates an example cable television system 100 that may implement OFDMA along with other DOCSIS channels that may overlap. The system may be modified using the techniques disclosed herein for scheduling over such overlapping channels. The system 100 includes a headend facility (HEF) 110, a plurality of hubs 120(1)-120(m), and associated with each hub, a plurality of nodes 130(1)-130(n) and a plurality of customers 160(1)-160(p). The HEF 110 or hubs 120 may have a cable modem termination system (CMTS) (shown as CMTS 125 in the HEF 110 by way of example in FIG. 1). Each of the nodes 130 has one or more corresponding access points, and each of the customers 160 has one or more corresponding network elements 162, shown in FIG. 1 as a cable modem.

A single node 130 may be connected to hundreds of network elements. Described herein are techniques related to a cable modem network element 162; however it should be understood that the cable modem is used by way of example as the concepts apply to other network elements. Examples of network elements include cable modems, set top boxes, televisions equipped with set top boxes, data over cable service interface specification (DOCSIS) terminal devices, media terminal adapters (MTA), and the like. Thus, where reference is made to a cable modem, the concepts also apply more broadly to a network element.

A cable television system 100 provides one or more of commercial TV services, Internet data services, and voice services, e.g., Voice-over-Internet Protocol (VoIP) to one or more customer locations 160 (i.e., end users) in a given geographic area. To provide these services, the HEF 110 in the example cable television system 100 in FIG. 1 is shown coupled via a content delivery network 115 to a plurality of content providers 105, an IPTV server 116, and a public switched telephone network (PSTN) 117.

The content delivery network 115 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 115 comprises, for example, a packet-switched network that is capable of delivering IP packets or data elements from an IPTV Server 116 to clients 160(1)-160(p), using, for example, a cable data network, PON, or the like. Examples of a content delivery network 115 include networks comprising, for example, managed origin and edge servers or edge cache/streaming servers.

The content delivery servers 115 deliver content via one or more wired and/or wireless telecommunication networks to users 160(1)-160(p). In an illustrative example, content delivery network 115 comprises communication links 150 connecting each distribution node and/or content delivery server to one or more client devices, e.g., for exchanging data with and delivering content downstream to the connected client devices 160(1)-160(p). The communication links may include, for example, a transmission medium such as an optical fiber, a coaxial cable, or other suitable transmission media or wireless telecommunications.

By way of example, the cable television network in FIG. 1 may be a hybrid fiber-coaxial (HFC) cable network system 100; however, it should be understood the network may be all fiber, all coaxial, some combination of the two, or include the use of other communications mediums. A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 130 communicate via optical fibers with the hubs 120 and via coaxial cable to customer premises 160.

The HEF 110 and/or the hubs 120 may be coupled to the IPTV server 116 and PSTN 117 via CDN 115, e.g., the Internet, for providing Internet and telephony services (e.g., to and from customer 160(1)-160(p)) via the CMTS, a headend processor. The CMTS 125, in an embodiment, is a general-purpose computing device or application-specific integrated circuit (ASIC) that converts downstream digital data to a modulated RF signal, which is carried over the fiber and coaxial lines in the HFC network 150 to one or more customer locations 160. A communication interface may connect the CMTS 125 to the content delivery network 115 for routing traffic between the HFC network 150 and the internet network, the IP network 115, a PSTN, and/or the content providers 105. The various content providers, 105 for example, may be the source of media content (e.g., movies, television channels, etc.).

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 1, the edge QAM 112 is shown in the headend, but the edge QAM 112 may be located downstream from the CMTS 125. The CMTS 125 may host downstream and upstream ports and may use separate F connectors for downstream and for upstream communication for flexibility. In embodiments, a communication interface utilizing downstream channels 1-4 connects the CMTS 125 to a portion of the HFC network 150 for communicating over the HFC network 150.

By way of example, embodiments below describe a cable modem network element at the customer's premises for receipt of the modulated signals from the HEF and/or CMTS. A cable modem is a type of network bridge and modem that provides bi-directional data communication via radio frequency channels on a cable television network, such as a hybrid fiber-coaxial plant (HFC) or RFoG infrastructure. For example, a cable modem can be added to or integrated with a set-top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 162 may be connected to IPTV receivers or other items of CPE. A customer PC or laptop as well as other associated devices such as tablets, smartphones or home routers are termed customer premises equipment (CPE).

The network element, e.g., cable modem, 162 is connected through the network 150 to the CMTS 125. The cable modem converts signals received from the CMTS 125 carried over fiber and/or coaxial lines in the network. In the upstream the cable modems 162 may convert digital data to a modulated RF signal for upstream transmission and in the downstream the cable modems 162 may convert downstream RF signals to digital form. Thus, the conversion is done at a subscriber's facility. In the downstream, the cable modem 162 demodulates the downstream RF signal and feeds the digital data to a CPE or an IPTV, for example. On the return path, digital data is fed to the cable modem (from an associated PC in the CPE, for example), which converts it to a modulated RF signal for upstream transmissions. Once the CMTS 125 receives the upstream RF signal, it demodulates it and transmits the digital data to its eventual destination. Cable modems 162 are therefore useful in transforming the cable system into a provider of video, voice and data telecommunications services to users.

DOCSIS is an international telecommunications standard that permits the addition of high speed data transfer to an existing cable television (CATV) network, such as cable television network 100. DOCSIS is employed by many cable television operators to provide Internet access over their existing network infrastructures, e.g., a hybrid fiber-coaxial (HFC) infrastructure, PON architectures, etc. Cable operators include multiple system operators (MSO)s, an operator of multiple cable or direct-broadcast satellite television systems. Any cable company that serves multiple communities is considered an MSO, though the term is often used to refer to companies that own a large number of cable systems, such as Rogers Communications, Shaw Communications, and Videotron in Canada; Cablevision, Charter Communications, Comcast, Cox Communications, and Time Warner Cable in the United States; or Virgin Media in the UK.

The cable television network 100 may be compliant with DOCSIS 3.1 as well as legacy (pre-3.1) DOCSIS protocols. The DOCSIS protocol is the protocol used to send digital video and data between a hub 120 or headend facility 110 and cable modem 162. DOCSIS is used to convey Internet or other packet-based networking information, as well as packetized digital video between CMTSs 125 and cable modems (CMs) 162. While embodiments are disclosed with reference to DOCSIS, the techniques for transmitting simultaneously on overlapping channels may apply to other networks or systems. For example, the disclosed techniques may apply to other systems that use OFDM-based profiles.

A typical DOCSIS architecture includes a cable modem (CM) 162 located at the customer premises 160, and a cable modem termination system (CMTS) 125 located at the CATV headend 110, as in the example cable television network 100 depicted in FIG. 1. In an embodiment, a memory in the headend 110, such a memory of the CMTS 125 or edge device 112, may include a DOCSIS program that implements the DOCSIS specification.

DOCSIS provides a variety of options available at Open Systems Interconnection (OSI) layers 1 and 2, the physical layer, and the data link layer. A DOCSIS physical layer may include the basic networking hardware transmission technologies of a network. A DOCSIS physical layer defines the means of transmitting raw bits rather than logical data elements over a physical link connecting network nodes. The bit stream may be grouped into code words or symbols and converted to a physical signal that is transmitted over a hardware transmission medium. The modulation schemes available for use and similar low-level parameters are defined by the DOCSIS scheme.

The evolving DOCSIS 3.1 platform employs orthogonal frequency division multiple access (OFDMA) subcarriers for RF transmission, where the frequency-division multiplexing (FDM) scheme is used as a multi-carrier modulation method using multiple subcarrier signals that are orthogonal to each other. For example, a large number of closely space orthogonal subcarriers may be used to carry data on several parallel data streams or channels. Using orthogonal subcarriers minimizes or eliminates cross-talk between the subcarriers and inter-guard bands are not required i.e., the separate filter for each sub-channel is not required as it is in frequency division multiplexing (FDM).

In DOCSIS implementations, the OFDMA scheme may replace the DOCSIS physical layer or supplement the existing ATDMA with OFDMA. Thus, in DOCSIS 3.1 the physical layer (PHY) may change from previous versions of DOCSIS to be a new form based on OFDMA technology, both in upstream and downstream. The multicarrier orthogonal frequency-division multiple access (OFDM) channels can coexist anywhere in the downstream spectrum with legacy single-carrier quadrature amplitude modulation (QAM) channels. In evolving DOCSIS implementations, the subcarriers may be smaller than the previous 6 MHz and 8 MHz wide channel spacing, e.g., DOCSIS 3.1 may use 25 kHz to 50 kHz OFDMA spacing between subcarriers. A single OFDMA channel may be composed of many subcarriers of a fixed bandwidth. In an example DOCSIS 3.1 implementation, the OFDMA subcarriers are bonded inside a block spectrum that may be up to 192 MHz wide (96 MHz in existing U.S. systems).

The use of OFDMA as a PHY technology in the downstream direction enables specifying modulation profile parameters at the subcarrier or minislot level. Thus, instead of a single modulation setting for the entire OFDMA channel, each subcarrier in the OFDMA channel may have a different modulation setting. The modulation level (i.e., number of points in the QAM constellation) of each subcarrier may vary depending on the transmission quality of the medium. For example, at a first frequency the subcarrier may use very high modulation to pass data. But, another frequency above or below the first frequency may have an impediment, and a lower modulation setting may be desirable. Consider an HFC cable plant with a frequency characteristic referred to as rolloff, where the transmission amplitude starts to tail off due to the physical characteristics of the equipment within the cable plant. When the transmission amplitude degrades enough, the subcarriers in that region may advantageously use a lower level of modulation so that the receiving cable modems can properly demodulate those subcarriers.

In the upstream, scheduling over any of the TDMA, ATDMA, SCDMA, or OFDMA channels is challenging due to the following possible needs:
1. Need to schedule regular initial and station maintenance opportunities to keep modems registered;
2. Need to schedule BW request opportunities for CMs to request resources;
3. Need to accommodate CMs at different places in the network with different delays and Request-Grant-Cycle. Map-ahead time needed to accommodate the furthest CM on the plant;
4. Need to satisfy the peak-rate and average BW constraints for each CM;
5. Need to accommodate different kinds of traffic with different latency/throughput requirements (UGS, etc.); and
6. Need to coordinate transmissions and resource requests across all CMs on an US channel (or service group). Simultaneous transmissions are allowed over multiple TDMA/ATDMA channels and are permitted even within the same channel for SCDMA channels.

Further, in some instances, time-division coordination is required between channels in addition to the coordination of transmissions within each of the channels. However, in pre-DOCSIS3.1 CMTSs, US schedulers for multiple Advanced Time Division Multiple Access (ATDMA) channels run individually and grant access to each channel independently, without coordination.

The disclosed combination of two different channel schemes introduces a Time and Frequency Division (TaFD) US scheduler. As described in more detail below, the disclosed scheduler can support OFDMA channels that overlap with ATDMA channels, where the US scheduler of an OFDMA channel is affected by the US scheduler of an ATDMA channel and vice versa when the channels share the same spectrum.

As described in more detail below, the disclosed techniques for scheduling using a TaFD scheduler addresses the lack of existing overlapping channels feature (i.e., independent time division (TD) and frequency division (FD) scheduling exist, but not combined). Disclosed herein are techniques for efficient implementation of a TaFD US scheduler that combines time division and frequency division. In embodiments, the disclosed techniques approximate TaFD behavior while not capitalizing on the implementation of existing US schedulers. In embodiments, full TaFD functionality is possible along with implementation with current US schedulers, e.g., concepts may be built on top of the existing US schedulers. In embodiments for approximating the TaFD functionality, various schedulers may be employed. For example, different US scheduler models (i.e., mapper models) may schedule channels.

Figure 2:
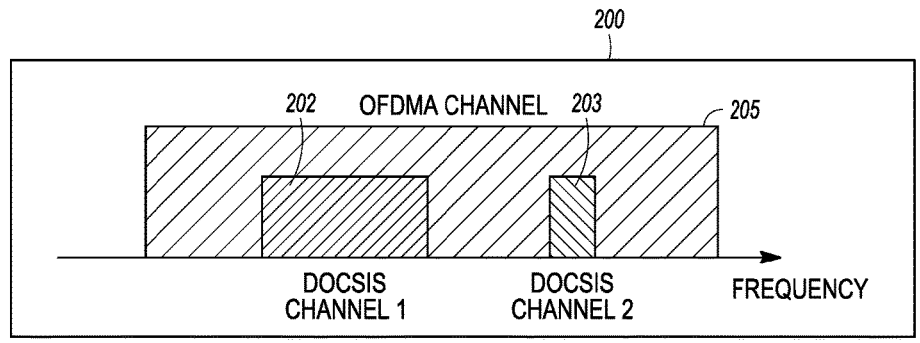
FIG. 2 depicts an upstream spectrum shared in a DOCSIS environment.

FIG. 2 depicts an upstream spectrum 200 shared in a DOCSIS environment. In order to explain the different models, assume a scenario where the US spectrum needs to be shared by three channels. By way of example, FIG. 2 shows two legacy D3.0 channels, 202 and 203, and a single D3.1 OFDMA channel 205. An orthogonal frequency division multiple access (OFDMA) channel, such as OFDMA channel 205, is composed of many subcarriers of a fixed bandwidth. As described above, each subcarrier in an OFDMA channel may use a different modulation. The frequency of DOCSIS Channel 1 202 is shared with the OFDMA channel 205, and so is the frequency of DOCSIS Channel 2 203. Disclosed is a scheduler that can accommodate such overlapping frequencies between channels.

Firstly, consider an objective of a frequency division (FD) US scheduler to base its scheduling between the channels, e.g., overlapping DOCSIS 3.0 (D3.0) and DOCSIS 3.1 (D3.1) channels, completely on frequency division. FIG. 3 illustrates an example in frequency division scheduling in which the D3.1 channel 301 can only use frequencies that are not used by legacy D3.0 channels, 302 and 303. Note that the hashed regions represent the frequencies that can be utilized by the D3.1 OFDMA channel 301, and the hashed regions/frequency bands are limited such that the OFDMA channel 301 is not permitted to burst across the whole spectrum.

Figure 3A:
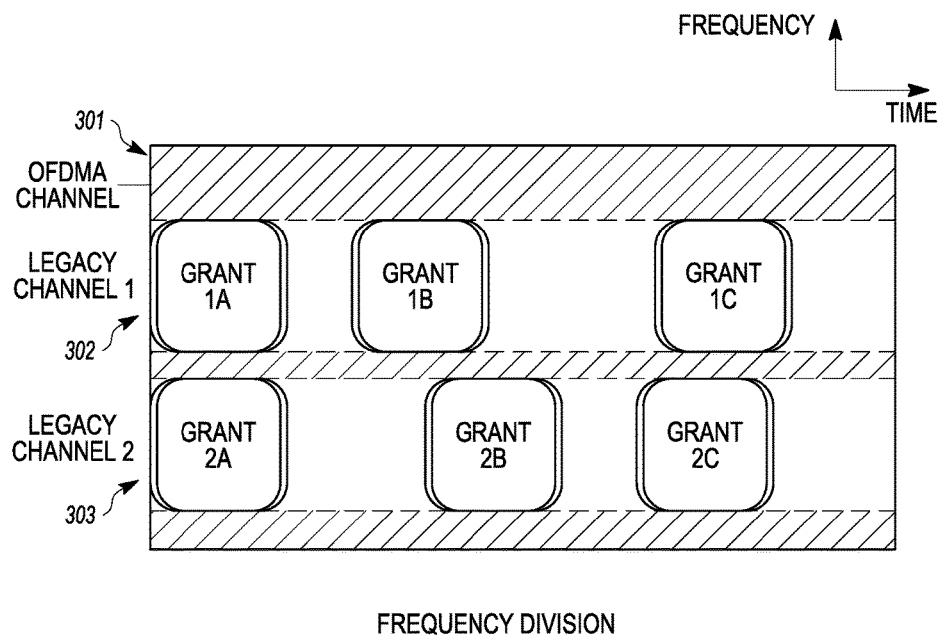
FIG. 3A illustrates an example in frequency division scheduling in which the D3.1 channel uses frequencies unused by legacy D3.0 channels.

Thus, as illustrated in FIG. 3A, the OFDMA channel cannot use frequencies that are used by legacy channels 302, 303, even when those legacy channels are not bursting. This introduces major limitations to the performance of D3.1. Because MSOs are moving to D3.1 to increase the capacity of the cable system, the limitations are not acceptable by Multiple System Operators (MSO)s. In particular, if the spectrum is full of legacy channels that need to coexist with OFDMA channels for long time, then the OFDMA channel will be unable to present any significant capacity improvement as it should. Bonding may improve the limitations, but still less efficient because bonding still does not enable the OFDMA to burst across the whole spectrum.

Figure 3B:
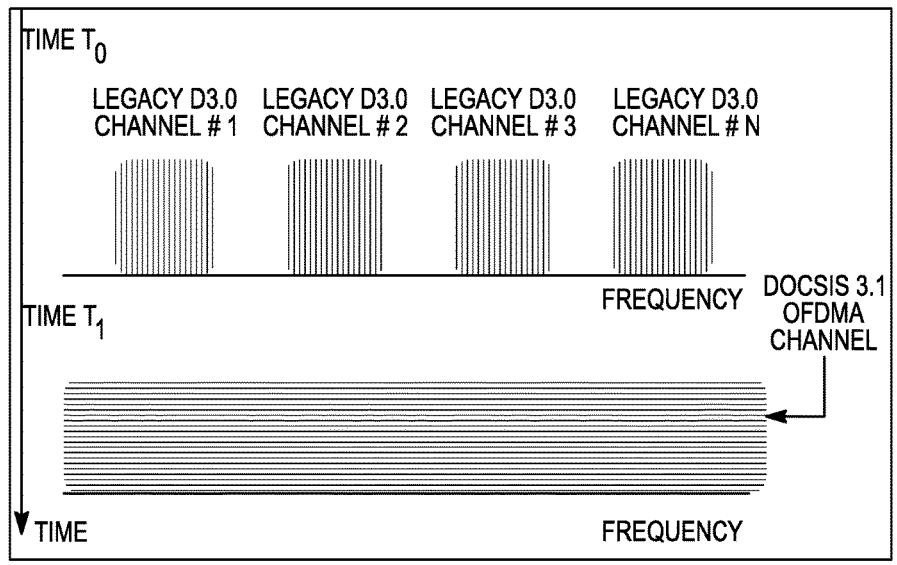
FIG. 3B illustrates time division upstream scheduling for which either OFDMA or ATDMA is allocated access to the whole spectrum at any moment of time.

FIG. 3B illustrates time division scheduling depicting a set of ATDMA channels, legacy D3.0 channels 1-N, that are granted access to the spectrum simultaneously at Time instant T0, using distinct frequency bands, while the OFDMA channel is provided access to the whole spectrum at time instant T1. This is in part due to the existing time division US scheduling, in which OFDMA or ATDMA is allocated access to the whole spectrum at any moment of time, but not ever at the same time. In time division scheduling, each technology may have access to the spectrum at a time, but only one at a time (i.e., overlapped use of spectrum but not at distinct, non-overlapping times). Thus, either for single carrier QAM or multi-carrier QAM, only one technology can use a spectrum at a time, shown repeating in FIG. 3B. However, this scheduling scheme still results in wasted spectrum since the channels are limited to transmissions at certain non-overlapping times. This scheme may be even more wasteful of spectrum if one technology or some channels within that technology are not used during their time slots due to a low amount of offered traffic.

As shown in FIGS. 3A (frequency division) and 3B (time division), scheduling results in granting spectrum for a single carrier, and it stays with that single channel the whole time. The leftover spectrum over that time may be used for OFDMA transmissions. However, not much spectrum is leftover for OFDM higher speed channels.

Figure 3C:
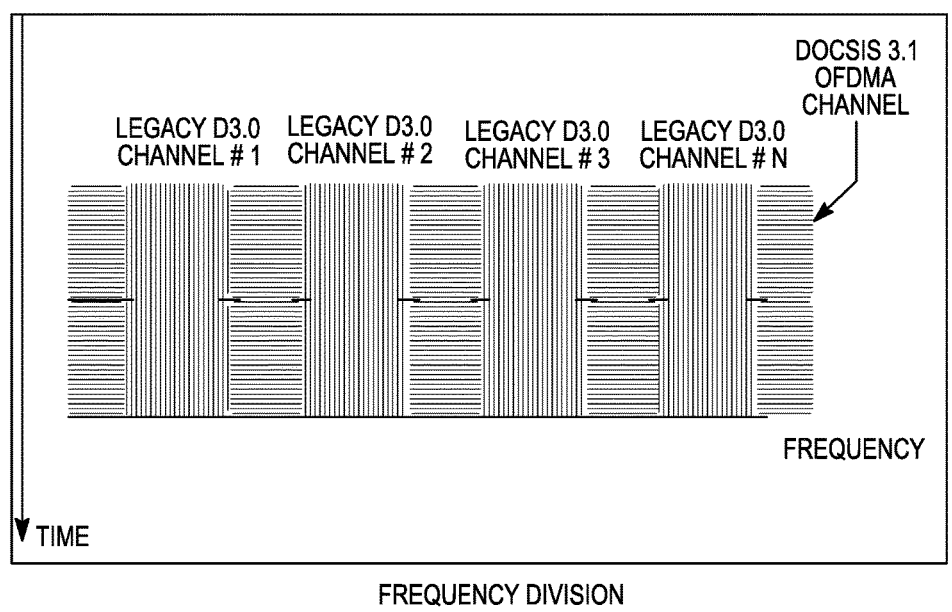
FIG. 3C illustrates a frequency division (FD) US scheduler where each technology (OFDMA or ATDMA) is allocated certain portion of the spectrum for the whole time.

FIG. 3C illustrates a frequency division (FD) US scheduler where each technology (OFDMA or ATDMA) is allocated certain portions of the spectrum for the whole time. For example, the SC-QAM channels may be allocated their spectrum continuously and operate as they do in DOCSIS 3.1 and previous DOCSIS versions. Similar is applicable to the OFDMA channel in this scheme, where the OFDMA channel is allocated only portions of the spectrum in frequency, i.e., portions that are not utilized by the SC-QAM channels. If the number of SC-QAM channels is large, then the amount of spectrum left for OFDMA may not have enough to support the required capacities.

Figure 4:
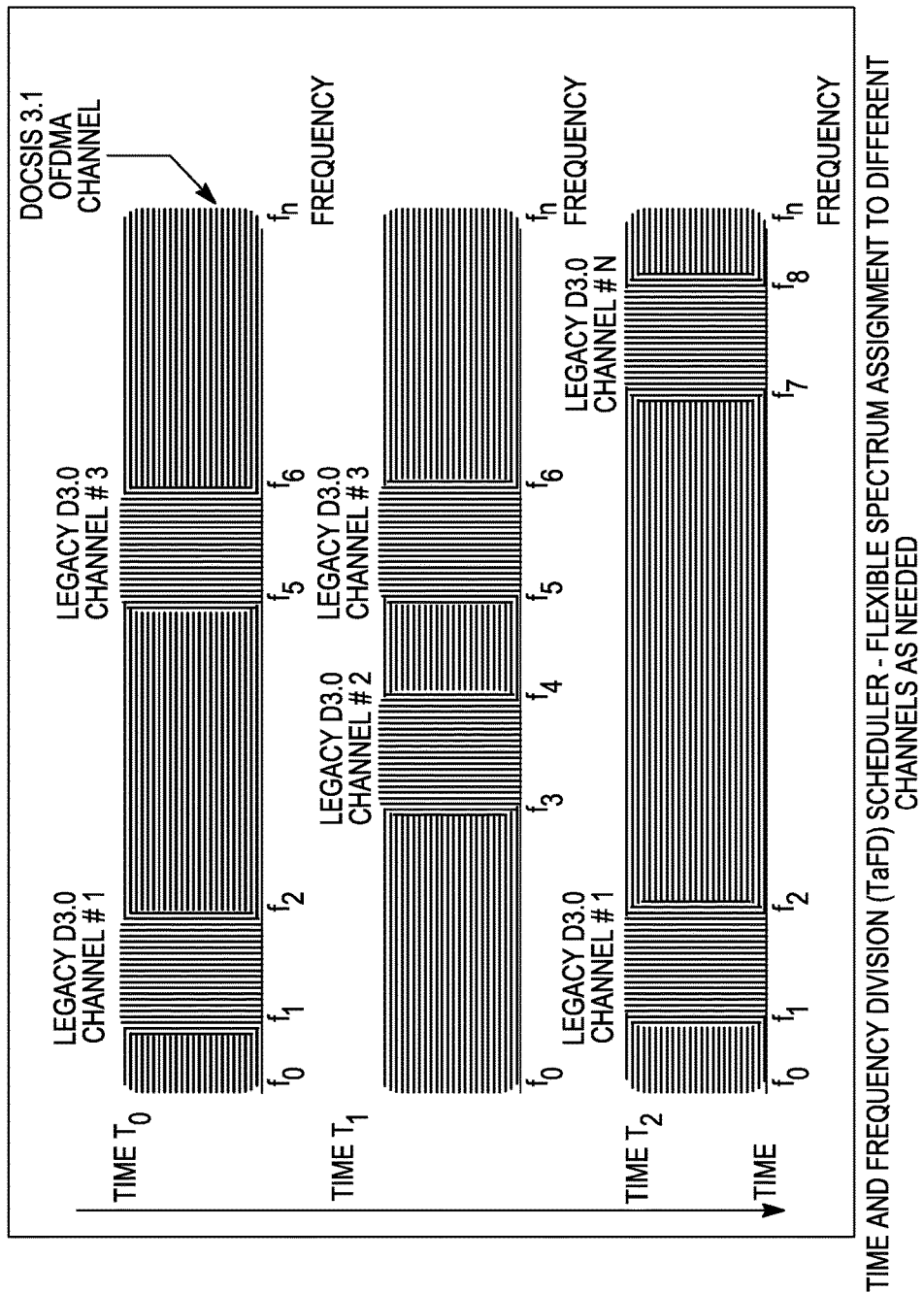
FIG. 4 depicts an embodiment for approximating time and frequency division (TaFD) functionality in a time division (TD) scheduler, where the OFDMA channel is allowed to burst only when all legacy D3.0 channels are quiet.

FIG. 4 depicts an approach for a time division scheduler. In these embodiments, the OFDMA channel 401 is allowed to burst only during times when all legacy D3.0 channels, such as legacy channels 402, 043, are quiet (e.g., non-transmitting or non-bursting, and/or not scheduled to transmit or not granted BW), illustrated by the hashed areas in FIG. 4. Scheduling the legacy DOCSIS (DOCIS 3.0 and earlier) and non-legacy DOCSIS channels (DOCSIS 3.1 and later) allows the OFDMA channel to burst across the whole spectrum, just not when a legacy channel is also transmitting. Such scheduling facilitates a simpler scheduler where one kind of traffic (D3.0 vs. D3.1) is scheduled at a time. In some scenarios, this approach is still inefficient for D3.1 channels. For example, single carrier QAM would still synchronize with each other, but as shown by the example in FIG. 4 where grants 1A, 1B, 2A, and 2B are not synchronized, OFDMA is unable burst any time when any single QAM are bursting.

Figure 5A:
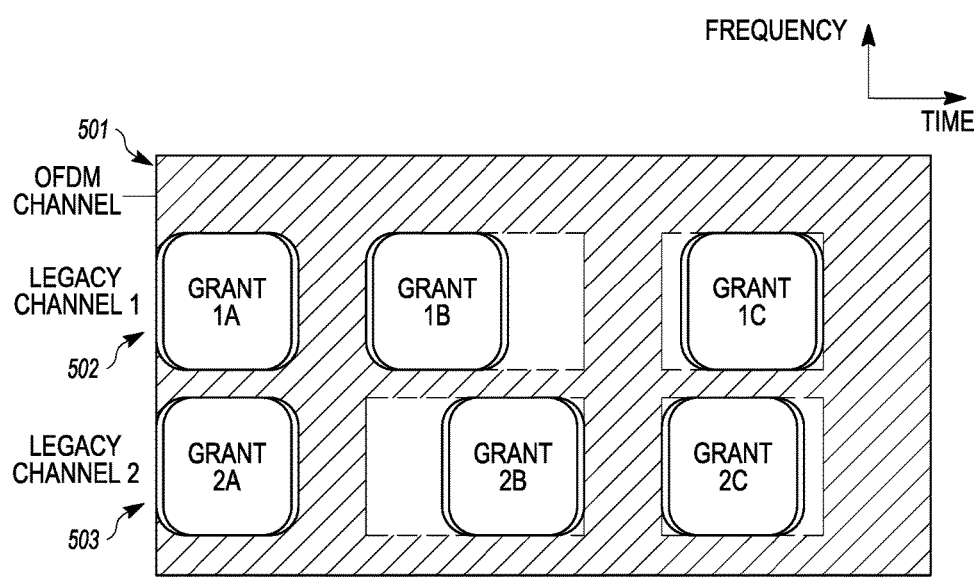
FIG. 5A depicts another embodiment for approximating TaFD functionality that performs coarse TaFD US scheduling based on a hybrid time division-frequency division (H-TD-FD) scheme.
Figure 5B:
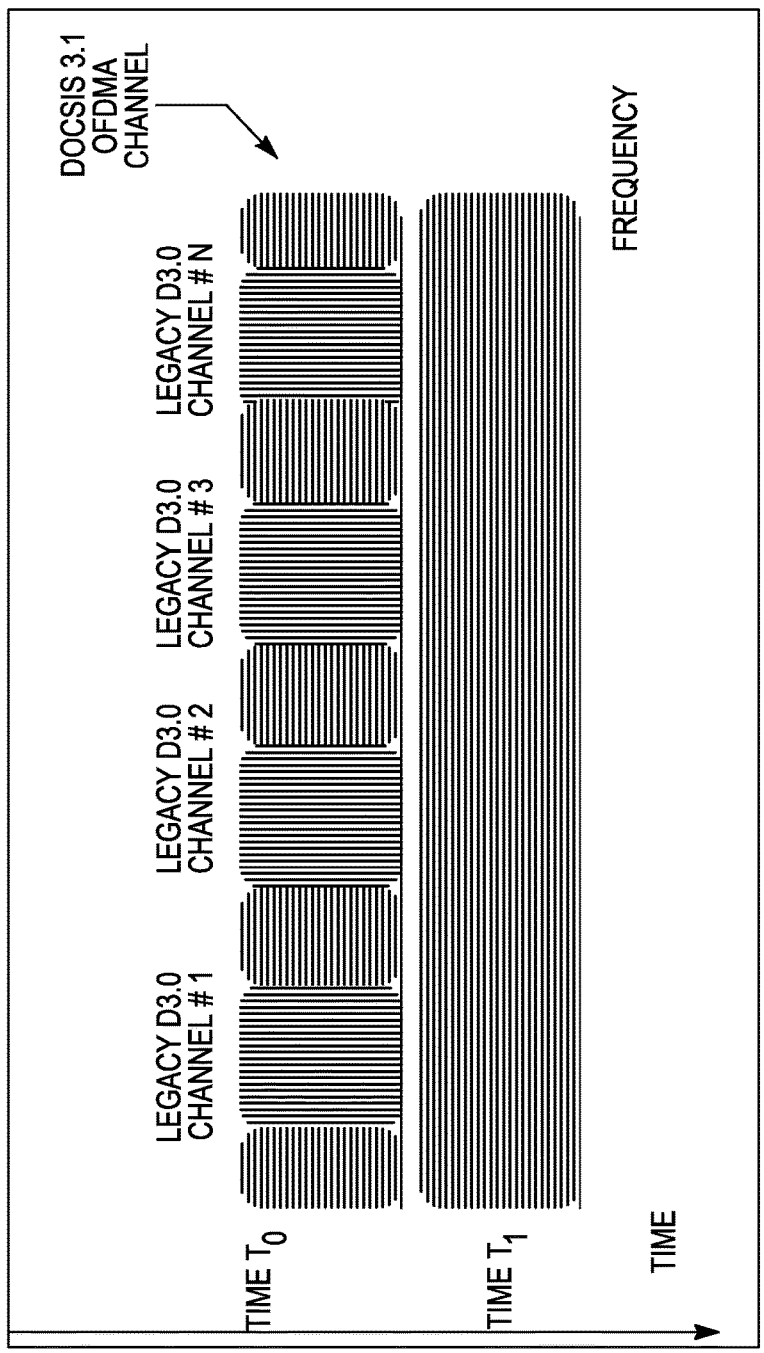
FIG. 5B depicts another embodiment for H-TD-FD scheduling.

FIGS. 5A and 5B depict embodiments for approximating TaFD functionality that performs coarse TaFD US scheduling in a hybrid TD-FD scheme. In particular, a combination of frequency division and time division is disclosed, where scheduling of shared spectrum is both time and frequency dependent. The approach shown in FIGS. 5A and 5B builds on the top of the approach shown in FIGS. 4 and 4B, respectively, adding the FD feature to the TD feature. In this embodiment, the D3.1 OFDMA channel 501 can be active all the time on frequencies that are not used by the D3.0 channels 502, 503. For example, legacy channels 1 and 2 may each transmit in respective frequency bands, while the OFDM channel is transmitting on another frequency band in the spectrum shared with each respective channel at the same time.

While the illustration in FIG. 5A depicts a scheme in which the frequency bands occupied by the legacy D3.0 channels are collectively unavailable to the OFDM channel while any one (or more) legacy D3.0 channel is transmitting within a particular time slot, the disclosed hybrid approach is more efficient than that shown in FIGS. 3 and 4. For example, FIG. 3A's frequency division scheduling technique does not permit the same frequencies to be used for both legacy and non-legacy channels, instead frequency bands are dedicated to a single channel. Similarly FIG. 4's time division scheduling technique opens up access to the entire spectrum for a channel, but only at designated times, i.e., different technologies or channel types are not permitted to transmit simultaneously.

In contrast, the disclosed hybrid time division and frequency division (H-TD-FD) US scheduler is based on a combination of time division and frequency division schedulers. In particular, this scheme provides the benefits of a TD scheme but with an added benefit that an OFDMA channel is able to use the portions of the spectrum that are unused by SC-QAM channels, even when those SC-QAM channels are ON (i.e., bursting or transmitting). Compared to the FD scheduler, the H-TD-FD scheme can provide high peak rates as was the case for the TD scheduler. Moreover, it may reduce a multiplexing latency for the OFDMA channel to zero.

Referring to 5A, a two-pool architecture may be employed to simplify the US scheduler complexity. For example, a first pool may comprise the D3.0 channels, e.g., 402, 403; 502, 503, when overlapping with the D3.1 channel, e.g., 401, 501 and a second pool may be comprised of the D3.0 channels. As shown in FIG. 5A, while the D3.1 channel 501 is active all the time on frequencies that are not used by D3.0 channels 502, 503, D3.1 and D3.0 channels need to time-share the overlapping frequencies. In particular, the overlapped frequencies are granted to either the first pool or a second pool at a time or for each period by the US scheduler, such that switching between grants occurs at the D3.1 frame boundaries. D3.1 grants occur when all D3.0 are quiet during the overlapping frequencies.

FIG. 5B provides another perspective of the frequency vs. time plot for legacy D3.0 channels #1-N and an OFDMA channel using the disclosed hybrid time-division frequency-division approach. As shown, at Time $T_0$, the legacy D3.0 channels utilize portions of the spectrum at respective frequency bands, and the OFDMA channel may occupy the remaining spectrum. However, at Time $T_1$, the OFDMA channel may use the entire spectrum where no legacy D3.0 channels are transmitting. Thus, while the legacy D3.0 channels are still on and able to transmit, they are not currently occupying any frequencies or attempting to transmit, so the spectrum becomes available for OFDMA transmissions. The approach above may be implemented via a duty-cycle approach, where a duty cycle is the percentage of one period in which a signal is active. A period is the time it takes for a signal to complete an on-and-off cycle. For example, both signal types that use the same spectrum but at different times can have a time period allocated, e.g., a time period allocated for ALL SC-QAM channels and another time period allocated for the OFDMA channel. To determine the length of each period, the time domain may be divided into fixed intervals (for repetition). A portion of an interval may be assigned for all SC-QAM channels, which may transmit together being on different frequencies. Another portion of the same interval may be assigned for the OFDMA channel. For purposes of example, consider that to determine a duty cycle for the SC-QAM channel a duration of the interval allocated to SC-QAM channels is considered as an ON time and a duration of the interval allocated to the OFDMA channel is an OFF time, such that the duty cycle for SC-QAM is the ON time divided by duration of the interval. As a formula, a duty cycle may be expressed as:

$$D = \frac{T}{P} * 100\%$$

Where:
D is the duty cycle,
T is the time the signal is active, and
P is the total period of the signal.

Thus, for example, a 60% duty cycle means the signal is on 60% of the time but off 40% of the time. The "on time" for a 60% duty cycle could be a fraction of a second, a day, or even a week, depending on the length of the period.

The duty-cycle approach may control the utilization of the D3.0 channels and D3.1 channel. In embodiments, the duty-cycle approach can be implemented per channel (as opposed to per pool) to increase the capacity of the D3.1 channel. The scheduler may group the D3.0 grants together to leave more time to be allocated to the D3.0 channel.

The initial value of the duty cycle can be configurable. Further, the US scheduler can support a mode to adjust the duty cycle automatically. For example, in embodiments the US scheduler may adjust the duty cycle based on outstanding bandwidth demand or a prioritized pending bandwidth demand for either bandwidth requests or unsolicited grant service flows (i.e., the number of pending input/output requests for a channel) requested in some time interval/channel utilization for the different pools to maximize the capacity. In embodiments, the US scheduler may make adjustments based on a utilization of idle time. The automatic adjustment mode can be turned on and off.

Disclosed herein are techniques that range from a complete TaFD US scheduler functionality to a TaFD scheduler that is built on top of existing independent US channel schedulers. As described herein, an incomplete TaFD may approximate time and frequency division for channel scheduling, but such scheduler is not flexible or efficient, and requires new development because it is unable to rely on existing schedulers. Examples of a TaFD scheduler that is built on top of existing independent US channel schedulers, or is otherwise less flexible/dynamic for spectrum allocation, are shown in FIGS. 3A and 3C (frequency division), FIG. 3B (time division), and FIGS. 4, 5A and 5B (hybrids with duty-cycle approaches). Such incomplete schedulers trade-off between overhead and multiplexing latency.

The time division approach such as that shown in FIG. 3B may have the following inefficiencies: a) no traffic when a channel is granted access b) some grants cannot be fragmented, or c) there is little or no data available for transmission. Further, the incomplete scheduler approach is not as flexible for time-constrained services, such as UGS, or with some grant types, such as initial ranging. Similarly, the inefficiencies that may exist with a frequency division scheduler such as that shown in FIGS. 3A and 3C include low peak rate offering and an inefficient/inflexible scheduler with zero multiplexing latency. And the hybrid approaches, such as that shown in FIGS. 4, 5A, and 5B are attractive but have similar issues as the time division scheduling approach (e.g., inflexible, inefficient, and an overhead vs. multiplexing latency tradeoff). However, embodiments are described that take these various approaches because the solutions may be more practical for certain scenarios, e.g., if ease of implementation or less resources needed for scheduling are desired.

Figure 6A:
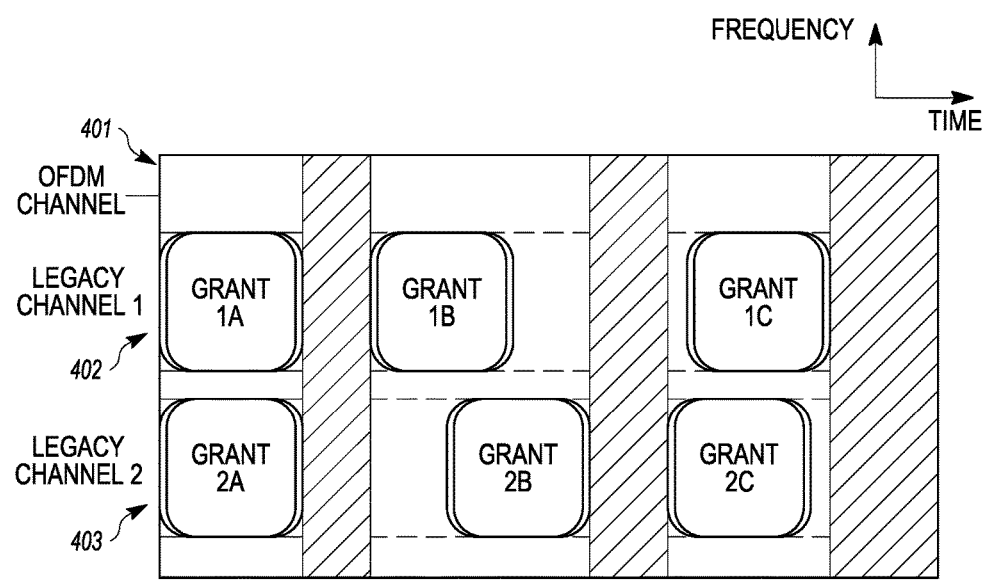
FIG. 6A illustrates a TaFD scheduling technique.

A complete TaFD US scheduler is one that has a flexible and dynamic allocation, which may provide a near optimal solution for allocating spectral regions to different DOCSIS technology as needed. An example of this is shown in FIG. 6A, which shows an example of flexible approach for time and frequency division that can be responsive to bursts, enable smooth migration between DOCSIS scheduling, and enable a high peak rate offering. At very high-level, the idea is to use TaFD Allocation Unit (TAU)-based credits to divide bandwidth/spectral resources within the overlapping spectrum. In embodiments, a TaFD Allocation Unit (TAU) may be the same as an OFDMA minislot.

FIG. 6A depicts the disclosed TaFD functionality using a combined time division (TD)-frequency division (FD) scheduler. As shown in FIG. 6A, the combined TD and FD scheduling technique combines both flexibility and efficiency. In this scheduling scheme, the resources within the time-frequency map are allocated between different technologies (ATDMA vs. OFDMA) as needed. For example, at three different times, $T_0$, $T_1$, and $T_2$, the same spectrum ($f_0$-$f_n$) may be allocated to different channels depending on the needs during that time period. In this example, at time T0, legacy D3.0 channel #1 uses the $f_1$-$f_2$ band of the shared spectrum, legacy D3.0 channel #3 uses the $f_5$-$f_6$ band of the spectrum, and the DOCSIS 3.1 OFDMA channel uses the remaining spectrum (the OFDMA channel is represented in this figure by the horizontal hash lines). At Time $T_1$, the legacy D3.0 channels #2 and #3 use frequency bands $f_3$-$f_4$ and $f_5$-$f_6$, respectively, while the DOCSIS 3.1 OFDMA channel may use the rest of the spectrum. At Time $T_2$, the legacy D3.0 channels #1 and #N use frequency bands $f_1$-$f_2$ and $f_7$-$f_8$, respectively, while the DOCSIS 3.1 OFDMA channel may use the rest of the spectrum. Thus, FIG. 6A represents a scheduling scheme by which the spectrum between overlapping channels, e.g., ATDMA and OFDMA channels, is shared and is allocated to either technology to accommodate the service requirements.

For example, a TDMA/ATDMA channel that is not overlapping with an OFDMA channel may be scheduled using existing techniques via a current US scheduler implementation that is based on hierarchy-priority-queueing. Thus, schedulers may be used for independent channels. Further, disclosed are techniques for providing communication between the independent schedulers. An OFDMA channel may also be scheduled based on the hierarchy-priority-queueing scheme. For a TDMA/ATDMA channel that overlaps with an OFDMA channel and for the portion of OFDMA channel that overlaps with TDMA/ATDMA channels, the scheduling may be based on hierarchy-priority-queueing combined with TAU-based allocations that coordinate the resources among overlapping (pieces) of the channels as shown in FIG. 6. In other words, schedulers for respective channel scheduling may still operate independently, but the disclosed TAU allocation may be incorporated in to the independent schedulers to enable management of overlapping frequencies between legacy DOCIS channels and OFDMA channels.

It is noted that for existing DOCSIS architectures that use either a 5-42 MHz or 5-85 MHz transmission band for legacy DOCSIS channels, it is desirable to add OFDM in those bands efficiently to share the frequency bands. However, overlapping different technologies is not coordinated in the existing architectures. With the TaFD scheduler, however, dividing resources between the technologies relies on time-and-frequency-division allocation credits that may be distributed between channels as described in more detail below.

Figure 6B:
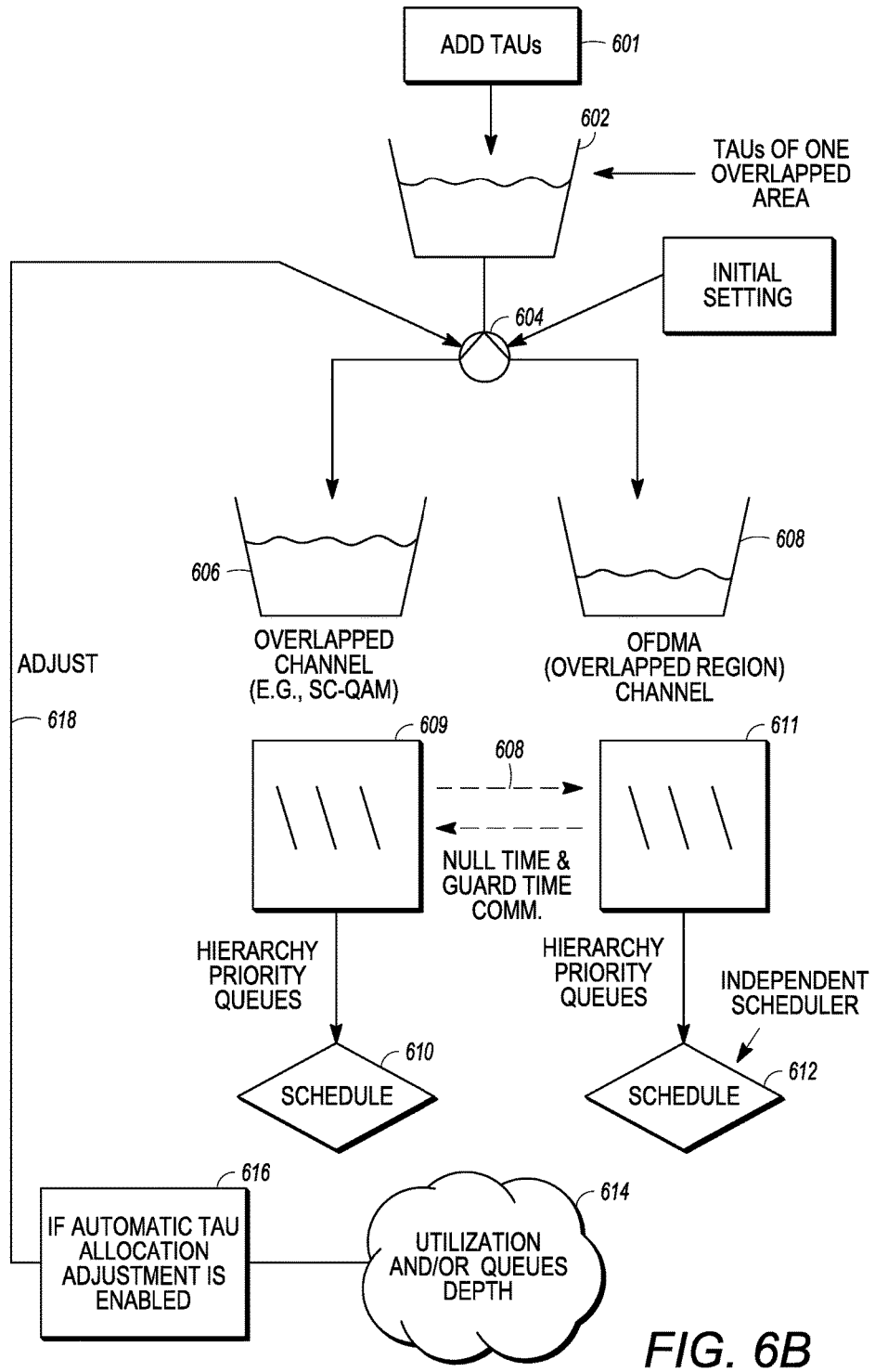
FIG. 6B depicts a TAU-based scheduling technique combined with hierarchy-priority-queuing scheduling for overlapping regions (TaFD scheduler).

FIG. 6B depicts a method for TAU-based scheduling combined with hierarchy-priority-queuing scheduling for overlapping regions, using a TaFD scheduler. The TaFD scheduler functionality is demonstrated by way of example in FIG. 6 for one overlapped area, where this architecture may be repeated for multiple SC-QAM channels overlapping with an OFDMA channel. As described in more detail below, embodiments comprise only repeating the TAU buckets (i.e., sets of TAUs) for multiple overlapping channels/regions within a signal OFDMA region and one set of queues per channel. The set of the queues may be the same set of hierarchy priority queues that are used in existing schedulers. Thus, the OFDMA scheduler may be similar to the SC-QAM scheduler. However, the limitations of a SC-QAM schedule are overcome by the disclosed scheduling techniques. For example, disclosed are techniques for communicating between independent schedulers by adjusting such scheduling based on TAU credits on top of the queues.

As shown in FIG. 6B, a bucket of TAU credits for an overlapped area is designated at 602. The source of the TAUs 601 that may be included in the bucket 602 may be determined based on the amount of bandwidth and frequency available within the shared spectrum. Bucket 602 represents the total number of TAU credits available for an overlapped spectral region of at least two channels sharing the same spectrum. It is noted that for non-overlapping channels, the whole spectrum may be used for the entire time; the concepts disclosed herein address regions of overlapping spectrum.

At 604, an initial setting is configured for distributing the TAUs between channels for the overlapped region. In this example, where the channels sharing spectrum are SC-QAM and OFDMA channels, a SC-QAM channel that overlaps with the OFDMA channel is provided with TAUs represented by bucket 606, which are allocated from bucket 602, and the overlapped region of the OFDMA channel is provided with TAUs represented by bucket 608, also allocated from bucket 602. The regions of an OFDMA are relevant because individual SC-QAM channels may overlap in their entirety with a region of the OFDMA channel.

Traffic for each channel may be queued in queues 609, 611, where each channel may maintain its own queue independently. In other words, each set of queues represents a scheduler, and two independent schedulers have two sets of queues. Thus, a set of queues may be based on priorities that are specific to the corresponding channel and independently designed as compared to other channels at issue. When a queue buffer becomes full, packets may be dropped.

Thus, each queue may be prioritized such that higher priority traffic for the respective channel is placed higher in the queue. Each queue may have an outstanding bandwidth demand or prioritized pending bandwidth demand and packets may be dropped when a queue size is exceeded. Higher priority queues are served before low priority queues.

By way of example, FIG. 6B illustrates the use of hierarchy priority queues 609, 611, a queuing approach that shapes traffic and allows a subset of the shaped traffic to be prioritized. Other queuing approaches may be employed, such as standard priority queuing (placing priority traffic in a priority queue, while all other traffic is placed in a best effort queue and other traffic may be policed), first-in, first-out (FIFO), fair queuing (maintaining a separate logical FIFO subqueues from an input class), or the like.

At 610 and 612, traffic over the overlapping channels, e.g., SC-QAM and OFDMA, may be scheduled for the overlapping regions. Note that the whole OFDMA channel has one set of queues, even if it has multiple overlapping regions. The set of queues are used for overlapping regions as well as non-overlapping regions. As shown in FIG. 6, scheduling over the overlapping channels may be implemented in view of the multiple queues, 609, 611 defined respectively for each channel. A hierarchy priority queue is a queue defined based on a priority queuing mechanism. Each scheduler may be maintained independently for each channel while coordinated via the use of the TAU allocations, thus allowing the disclosed techniques to be incorporated using existing schedulers that are independent but currently lacking any manner of coordinated scheduling.

Further, independent schedulers for each channel may communicate NULL and guard times at 608 with each other for scheduling overlapped regions without any collision. Referring to the embodiment depicted in FIG. 6B, such communication may occur at 610 and 612, for example. However, when the independent schedulers communicate with each other, the scheduler that receives a null request may place that request in its highest priority queue. Thus, at the point of scheduling (610 or 612), the queue is taken into consideration and may block its own scheduler from using the portion of the spectrum represented by the null request during that time, recognizing the null request portion of the spectrum represents spectrum in use by another channel and such use is what triggered the null communication.

At 614, the utilization and/or outstanding bandwidth demand or prioritized pending bandwidth demand may be analyzed for efficiency of the coordinated scheduling technique. For example, the utilization of the OFDMA channel of the allocated TAUs for the overlapped region and the utilization of the SC-QAM channel of the allocated TAUS for the overlapped region may be examined to determine if the allocation of TAUs is optimizing the usage of the shared spectrum between the channels. Likewise, the outstanding bandwidth demand or a prioritized pending bandwidth demand of the queues on which the schedulers may be based may be examined to determine whether there is sufficient spectrum for each channel and/or whether the TAU for a particular channel should be increased or distributed among channels in a different manner. For example, if the queues get full, it means that the available spectrum is not enough to satisfy the demand. Therefore, we increase the TAU for that channel and take it from the other channel which may not need it.

At 616, an automatic TAU allocation may be enabled for adjusting at 618 the allocation of TAUs defined at 604, which may be an adjustment to the initial setting or an adjustment to an adjustment previously made (i.e., an adjustment to a previously-adjusted setting). In other words, the method shown in FIG. 6B may be continuously performed for updating the TAU allocation between channels having overlapping spectral regions to maintain a distribution that optimizes utilization of such shared spectrum. The TAUs added at the beginning of its MAP at 601 for distribution to each scheduler may have enough TAUs to cover the time duration covered by both scheduler MAPs because these TAUs will be shared by both schedulers. Additional TAUs may be included in excess as long as they get allocated properly over the MAP duration. The TAU allocation may be flexible to handle different MAP sizes, start times between overlapping channels, and end times between overlapping channels. It is noted that bonding between overlapping D3.1 and D3.0 channels can be implemented with the disclosed techniques.

As an example scenario, consider that DOCSIS 3.0 Channel #1 (which overlaps with the OFDMA channel as described above, would like to transmit over the spectrum which is overlapping between DOCSIS 3.0/Channel #1 with the OFDMA allocated spectrum. The availability of time-and-frequency-divisional allocation credits would be distributed to two buckets, one for the DOCSIS 3.0 Channel #1 bucket and one for the OFDMA channel. At a particular duration in time, pointers in queue of the OFDMA channel will request grants to the overlapping spectrum, and recognize the area is booked by SC-QAM, or Channel #1 (i.e., as can be communicated between schedulers via null requests). Thus, the OFDM channel is allocated to be able to use the overlapping region of spectrum, but is unable to transmit for a particular time if is the spectrum is granted to the DOCSIS 3.0 channel or is blocked for some other reason (e.g., guards or quiet time). An allocation of time-and-frequency-divisional allocation credits can modify how the spectrum is granted, analyzing traffic and an outstanding bandwidth demand and/or a prioritized pending bandwidth demand of both channels and allocating the time-and-frequency-divisional allocation credits to each channel accordingly. Thus, the schedulers are still independent in the context of scheduling for its channel, but may communicate using null requests and base its scheduling based on the TAU allocation. In other words, each channel scheduler is independent from the other ones with respect to being able to freely schedule transmissions, where their association with each other is the TAU allocation, which does not otherwise impact the independent scheduling mechanisms. It is noted that the bucket approach described herein is used by way of example, and similar embodiments are contemplated. For example, a sliding time-based scheme may be incorporated, where a channel will ask for TAUs through its expected MAP end time, and then the allocator will calculate TAU division up to that time to divide the available TAUs between channels.

The underlying details for the embodiment for a TAU-based hierarchy-priority-queueing US TaFD scheduler operation shown in FIG. 6B may include features as described below.

At the head end, a scheduler (aka MapMaker) may schedule the upstream bandwidth traffic packets into slots (sometimes referred to as minislots) for a specific upstream channel. As shown in FIG. 6B, such schedulers 610 and 612 may be independent schedulers for scheduling traffic over separate channels. The slots for each channel represent an opportunity for a user device to transmit packet data and transmission over the slots may be scheduled by each upstream scheduler for each channel, e.g., 610, 612. All user devices may share the available timeslots based on the scheduler 610, 612 granting opportunities for the user devices to transmit. The scheduler 610, 612 may periodically transmit DOCSIS MAP messages containing the slot allocations to the cable modems to convey the transmission opportunities. As described herein, the disclosed independent schedulers may coordinate by communicating NULL time/guard time requests.

The schedulers 610, 612 may divide time into certain durations, i.e., MAP sizes. For each duration, the scheduler schedules US traffic and coordinate access to the channel over that duration. This duration may also be referred to as a MAP interval. At any point of time, the scheduler does the scheduling for a time duration that is in the future because it has to send that map to all CMs in advance so they have enough time to process it before the actual time duration occurs.

The MAP sizes may be independently configured per upstream channel and can be different across overlapping OFDMA & SC-QAM channels. OFDMA channels will nominally start and end their MAP minislot allocation times on OFDMA frame boundaries. The configured OFDMA map-size can be the same units as SC-QAM. Therefore, the configured OFDMA map-size is not required to be a multiple of the OFDMA frame duration, but the MapMaker may automatically adjust the OFDMA MAPs for OFDMA frame boundaries. Note the MapMakers may extend a MAP past the nominal MAP end time to fit in a grant without fragmentation.

As illustrated in FIG. 6B, the MapMakers may use a TAU-bucket approach to implement the utilization of the overlapping channels, e.g., OFDMA vs. SC-QAM channels. In embodiments, the number of TAUs per overlapping OFDMA frame region (e.g., bucket 602) may be equal to the number of OFDMA minislots in accordance with the following, where 400 kHz is the minislot size for OFDMA in D3.1:

Total TAUs in overlapping region/frame (ttpf)=overlapped frequency/400 kHz

As shown in FIG. 6B, an initial setting may be configured for distributing the TAUs between channels for the overlapped region. The dynamic TAU allocation percentage algorithm may use the initial setting value as the default. However, the initial setting can be disabled or defined differently. In embodiments, the TAUs may be allocated to a MapMaker for an overlapping region at the beginning of making a MAP according to the TAU allocation percentage and the anticipated MAP or OFDMA frame duration as follows:

Total TAUs per MAP (ttpm)=(ttpf*map-duration-usecs)/(OFDMA frame-size-usecs)

Allocated TAUs per MAP (atpm)=TAU allocation percentage*ttpm

As shown in the example in FIG. 6B, where the channels sharing spectrum are SC-QAM and OFDMA channels, the region of the SC-QAM that overlaps with the OFDMA channel is provided with TAUs represented by bucket 606, which are allocated from bucket 602, and the overlapped region of the OFDMA channel is provided with TAUs represented by bucket 608, also allocated from bucket 602, where the allocation may be determined by the above TAU allocation percentage.

The OFMDA MapMakers may track TAU usage separately for each overlapping SC-QAM channel in order to meet separate target utilization percentages per SC-QAM channel. For example, the initial setting defined at 604 of the TAU allocation percentage can be configurable (e.g., default: 75% for SC-QAM and 25% for overlapping OFDMA region). As described, at 614 the MapMaker may dynamically adjust the TAU allocation percentages over time based on queues depths and/or history (e.g., the previous 50 msec). At 616, the dynamic adjustment can be enabled/disabled by configuration.

The MapMakers (schedulers) 610, 612 of overlapping channels may run independently (for both SC-QAM and OFDMA). For example, the TAU bucket may be credited (filled once) per MAP, e.g., TAU bucket 606 for the SC-QAM scheduler 610 and TAU bucket 608 for the OFDMA scheduler 612.

TAUs from corresponding buckets 606, 608 may be consumed when scheduling a non-NULL grant in an overlapping region. A grant to a particular modem may or may not be sized/fragmentable to end at the OFDMA frame boundaries. Therefore, for an overlapping SC-QAM channel, if a specific modem grant ends prior to the OFDMA frame boundaries, not at the OFDMA frame boundaries, the TAU balances may be calculated toward the end of that frame (e.g., the last frame that is partially occupied by the grant) because an OFDMA channel would still need to schedule null grants across the whole duration of that frame. The rest of the frame may be filled with grants for other modems or maintained as idle time, which could belong to the current map or the next map. That is, for the channels overlapping the OFDMA channel (e.g., SC-QAM channels), inefficiencies due to the above may be avoided because the MapMaker will fill frame remainder regions with partial grants or idle Broadcast Request opportunities as available to improve efficiency. Channel bonding can also be used and OFDMA traffic can be put there as well.

In embodiments, the TaFDM NULL grants & guardbands may be inserted at 608 in the queues 609, 611 at the highest priority into the opposite overlapping channel to guarantee that only one channel is active per overlapping region at a time. For example, for SC-QAM channels, a requirement may exist to have a 1-minislot guard time when transitioning from NULL grant to active. For OFDMA, a requirement may include having a minislot guard band around SC-QAM channels when the SC-QAM channel is active. The guard time could be more or less than what is defined by a D3.1 ODMA minislots.

The adjustment to the TAU allocation made at 616 may account for a total number of idle granted minislots. Thus, idle time may be one of the metrics used by the dynamic TAU allocation adjustment algorithm to adjust the TAU allocation to each channel.

The probe request on the OFDMA channel will schedule a time in a future MAP where the OFDMA channel can allocate the entire frame for the probe. Probes are special signal types that the CM may transmit which can cover the whole channel. There are two types of probes, idle probe and active probe. In the idle probe, no CM is transmitting and the CMTS is measuring the background noise. In active probes, the CM transmits a known pattern to the CMTS so that the CMTS can estimate the pre-equalization coefficients to be sent to the CM.

Note that while FIG. 6B shows the mechanics of TaFD for one SC-QAM channel overlapping with an OFDMA channel (i.e., one overlapping region within the OFMDA channel), multiple channel overlaps would include a TAU bucket for each overlapping region. Thus, in the case when multiple SC-QAM channels overlap with a single OFDMA channels (i.e., multiple overlapping regions within the OFDMA channel), then there will be multiple TAU buckets for the OFDMA channel, where each of the overlapping regions has a corresponding TAU bucket. Although there will be multiple TAU buckets per an OFDMA channel with multiple overlapping regions, there may always be only one set of queues (i.e., one scheduler per channel regardless of the number of TAU buckets).

Figure 7:
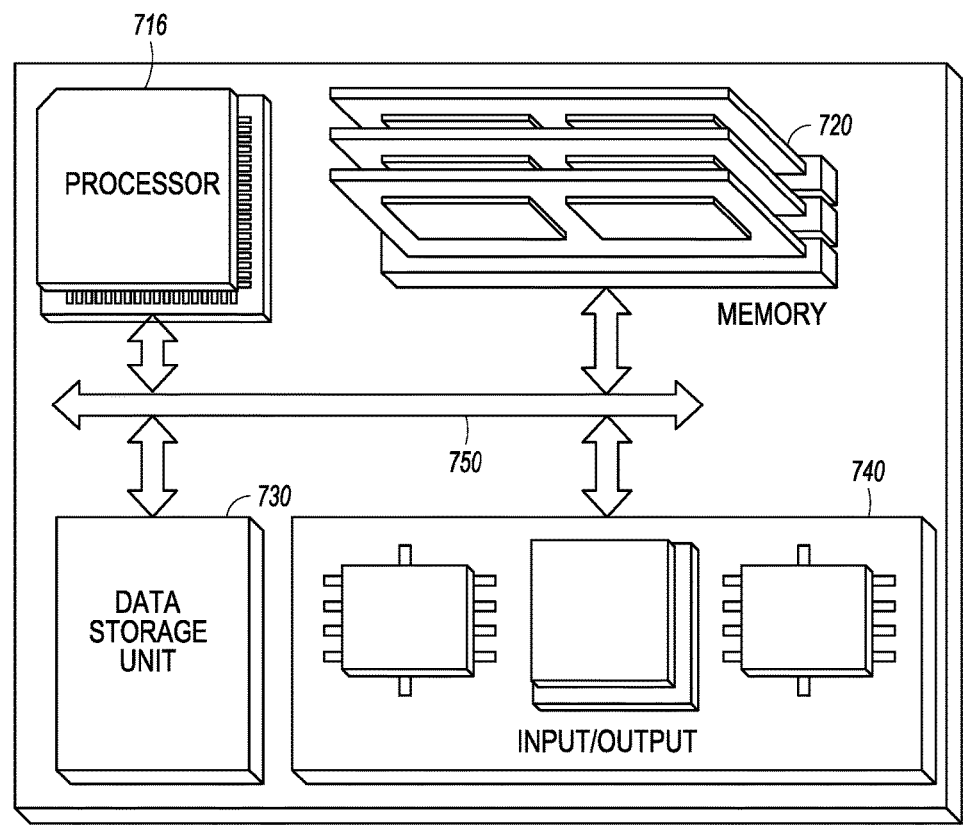
FIG. 7 is a block diagram of a hardware configuration operable to perform the functions disclosed herein.

FIG. 7 is a block diagram of a hardware configuration 700 operable to perform the functions disclosed herein. The hardware configuration may define a data source or computing device, such as a general hardware platform server configured to receive and transmit information over a network.

The hardware configuration 700 can include a processor 710, a memory 720, a storage device 730, and an input/output device 740. Each of the components 710, 720, 730, and 740 can, for example, be interconnected using a system bus 750.

The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730. In embodiments where processing device 160 includes two or more processors, the processors may operate in a parallel or distributed manner. Processing device 160 may execute an operating system of information server 120 or software associated with other elements of information server 120.

The memory 720 can store information within the hardware configuration 700. In embodiments, the memory 720 can be a computer-readable medium. In embodiments, the memory 720 can be a volatile memory unit. In embodiments, the memory 720 can be a non-volatile memory unit. In embodiments, the storage device 730 can be capable of providing mass storage for the hardware configuration 700. In embodiments, the storage device 730 can be a computer-readable medium. In various embodiments, the storage device 730 can, for example, include a hard disk device, an optical disk device, flash memory or some other large capacity storage device. In other embodiments, the storage device 730 can be a device external to the hardware configuration 700.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, and DSL are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for providing video, data, and/or voice services to a client device and/or a customer premise equipment device. In embodiments, the input/output device 740 can include driver devices configured to send communications to, and receive communications from one or more networks (e.g., access network 120 of FIG. 1, WAN 125 of FIG. 1, etc.). The input/output device 740 may function as a communication device that allows device 700 to communicate with another device over a network. Communication device 740 may include one or more wireless transceivers for performing wireless communication and/or one or more communication ports for performing wired communication.

In embodiments, a computer-readable storage medium has stored thereon instructions that, when executed, cause any of the functions described herein, including the method depicted in FIG. 6B. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. For example, the headend scheduler may be a processor capable of executing instructions or being controlled by instructions executed by another headend processor. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While this specification contains many specific implementation details, these should not be construed as limitations on the scope of any invention or of what may be claimed unless otherwise specified, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for scheduling simultaneous upstream transmissions over a plurality of channels in a shared spectrum, the method comprising:

identifying an overlapping region of frequency allocated to at least two channels that includes both a Data Over Cable Service Interface Specification (DOCSIS) orthogonal frequency division multiple access (OFDMA) channel and at least one additional DOCSIS channel;

identifying an initial distribution of time-and-frequency-division allocation units that divides the overlapping region of frequency between the at least two channels, wherein the time-and-frequency-division allocation credits are both time and frequency dependent;

scheduling grants to the overlapping region of frequency to either of the DOCSIS OFDMA channel or one of the at least one additional DOCSIS channels for upstream transmissions based on the initial distribution identified for the time-and-frequency-division allocation credits, evaluating a usage of the overlapping region of frequency by the at least two channels based on the initial distribution of time-and-frequency division allocation units, wherein evaluating the usage includes comparing between the at least two channels at least one of traffic, bandwidth demand, and/or queue size;

identifying an adjusted distribution of time-and-frequency-division allocation units between the DOCSIS OFDMA channel and the one of the at least one additional DOCSIS channels based on the evaluated usage of the overlapping region of frequency by the at least two channels; and scheduling grants to the overlapping region of frequency to either of the DOCSIS OFDMA channel or one of the at least one additional DOCSIS channels for upstream transmissions based on the identified adjusted distributed time-and-frequency-division allocation credits, wherein the scheduled grant of the overlapping region of frequency is switchable between the DOCSIS OFDMA channel and one of the at least one additional DOCSIS channels at a frame boundary of the DOCSIS OFDMA channel.

2. The method of claim 1, wherein the at least one additional DOCSIS channel is a legacy DOCSIS channel.

3. The method of claim 2, wherein the legacy DOCSIS channel is a single carrier quadrature amplitude modulation (SC-QAM) channel.

4. The method of claim 1, wherein the time-and-frequency-division allocation credits divide resources within the overlapping spectrum.

5. The method of claim 1, wherein scheduling is based on hierarchy priority queuing schemes maintained independently for each channel.

6. The method of claim 1, wherein schedulers for the DOCSIS OFDMA channel remain independent from the at least one additional DOCSIS channel having the allocated overlapping region of frequency.

7. The method of claim 6, wherein independent schedulers for each channel communicate NULL and guard bands with each other for scheduling the overlapped region of frequency without collision.

8. The method of claim 6, wherein the time-and-frequency-division allocation credits are allocated for DOCSIS OFDMA overlapped regions.

9. The method of claim 8, wherein the time-and-frequency-division allocation credits are dynamically adjusted, turned on, or turned off based on at least one of channel utilization, an outstanding bandwidth demand, a prioritized pending bandwidth demand, or idle time.

10. The method of claim 1, wherein scheduling is performed by at least one scheduler that is an upstream scheduler for DOCSIS networks having both legacy and D3.1 channels.

11. The method of claim 1, wherein a scheduler is incorporated into existing independent upstream channel schedulers scheduling for legacy DOCSIS channels.

12. The method of claim 1, wherein each of the overlapping frequency regions has a corresponding set of time-and-frequency-division allocation credits.

13. The method of claim 12, wherein there are multiple sets of time-and-frequency-division allocation credits for a single DOCSIS OFDMA channel, one set of time-and-frequency-division allocation credits associated with each of the multiple overlapping frequency regions within the single DOCSIS OFDMA channel.

14. The method of claim 13, wherein the single DOCSIS OFDMA channel scheduler is associated with only one set of queues.

15. The method of claim 13, wherein there is a single scheduler per channel scheduling based on corresponding respective sets of time-and-frequency-division allocation credits.

16. The method of claim 1, wherein frequencies within the shared spectrum are shared both in time and frequency between the channels with the overlapping regions of frequency allocation.

17. The method of claim 1, wherein the DOCSIS OFDMA channel and the at least one additional DOCSIS channels use different DOCSIS technology for transmission.

18. The method of claim 1, wherein the scheduling grants to the overlapping region of frequency to either of the DOCSIS OFDMA channel or one of the at least one additional DOCSIS channels for upstream transmissions based on the distributed time-and-frequency-division allocation credits comprises granting portions of the shared spectrum, allocated to but unused by the at least one additional DOCSIS channel, for use by the DOCSIS OFDMA channel.

19. The method of claim 1, wherein the DOCSIS OFDMA channel and the at least one additional DOCSIS channels shares spectrum in both time and frequency.

20. The method of claim 1, wherein a first pool includes a plurality of regions of a single DOCSIS OFDMA channel that overlap with a plurality of additional DOCSIS channels, and a second pool includes the regions of the additional DOCSIS channels that overlap with the single DOCSIS OFDMA channel, wherein the scheduling grants the overlapping spectrum to either the first pool or the second pool for a limited duration of time.

* * * * *